(12) United States Patent
Shan et al.

(10) Patent No.: US 11,788,409 B2
(45) Date of Patent: Oct. 17, 2023

(54) AUTO-COLLAPSIBLE PORE PRESSURE PROBE DEVICE AND OPERATING METHOD THEREOF

(71) Applicants: PowerChina Huadong Engineering Corporation Limited, Hangzhou (CN); OCEAN UNIVERSITY OF CHINA, Qingdao (CN)

(72) Inventors: Zhigang Shan, Hangzhou (CN); Miaojun Sun, Hangzhou (CN); Wei Wang, Hangzhou (CN); Heyu Yu, Qingdao (CN); Xiaolei Liu, Qingdao (CN)

(73) Assignees: PowerChina Huadong Engineering Corporation Limited, Hangzhou (CN); OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 18/180,233

(22) Filed: Mar. 8, 2023

(65) Prior Publication Data

US 2023/0203944 A1 Jun. 29, 2023

Related U.S. Application Data

(63) Continuation of application No. PCT/CN2022/127714, filed on Oct. 26, 2022.

(30) Foreign Application Priority Data

Sep. 30, 2021 (CN) .......................... 202111158026.5

(51) Int. Cl.
*E21B 49/00* (2006.01)

(52) U.S. Cl.
CPC .................................. *E21B 49/006* (2013.01)

(58) Field of Classification Search
CPC ......... E21B 49/006; Y02E 30/30; G01L 11/00
USPC ............................................................. 73/85
See application file for complete search history.

(56) References Cited

FOREIGN PATENT DOCUMENTS

| CN | 1790016 A | * | 6/2006 | | |
|----|-----------|---|--------|---|---|
| CN | 1790017 A |   | 6/2006 | | |
| CN | 104164860 A |   | 11/2014 | | |
| CN | 106802132 A |   | 6/2017 | | |
| CN | 111351700 A | * | 6/2020 | ............. | G01N 11/10 |
| CN | 111947826 A |   | 11/2020 | | |
| CN | 112254864 A |   | 1/2021 | | |
| CN | 112630859 A | * | 4/2021 | ............. | E02D 1/022 |

(Continued)

*Primary Examiner* — Marrit Eyassu

(57) ABSTRACT

An auto-collapsible pore pressure probe device, including a support system, a penetration system and a measurement system. The support system includes a first support frame, a second support frame, a separation mechanism, a ring clamp, a fixing nut, a fixing bolt, support legs, slots, a support base, and a third support frame. The penetration system includes a rod storage wheel, a motor, a tightening mechanism, a penetration drive motor, a gear, a fixing bracket, a fixing bolt, and a friction wheel. The measurement system includes a pore pressure probe, a control cabinet, a CPTU probe, a pore pressure sensor, a probe connector, an external thread, an internal thread, a fastening strip, a connecting bolt, a connector, a data transmission and power supply cable, a displacement sensor, and a deck unit. An operating method of the pore pressure probe device is also provided.

7 Claims, 8 Drawing Sheets

(56) References Cited

FOREIGN PATENT DOCUMENTS

| CN | 112630859 A | 4/2021 | | |
|---|---|---|---|---|
| CN | 112729667 A | 4/2021 | | |
| CN | 113865777 A | 12/2021 | | |
| EP | 3798365 A1 * | 3/2021 | .............. | E02D 1/00 |
| JP | 2017090344 A | 5/2017 | | |

\* cited by examiner 1-1

AUTO-COLLAPSIBLE PORE PRESSURE PROBE DEVICE AND OPERATING METHOD THEREOF

CROSS-REFERENCE TO RELATED APPLICATIONS

This application is a continuation of International Patent Application No. PCT/CN2022/127714, filed on Oct. 26, 2022, which claims the benefit of priority from Chinese Patent Application No. 202111158026.5, filed on Sep. 30, 2021. The content of the aforementioned application, including any intervening amendments thereto, is incorporated herein by reference in its entirety.

TECHNICAL FIELD

This application relates to seafloor exploration technology, and more particularly to an auto-collapsible pore pressure probe device and an operating method thereof.

BACKGROUND

Marine disasters are characterized by various forms, wide distribution, and high frequency and large prediction and prevention difficulty, and China is one of the countries most seriously affected by marine disasters in the world. In recent years, affected by global climate change, the extreme storms featuring strong paroxysmal characteristic, long duration and wide range have become increasingly frequency and intense, and under such conditions, environmental loads, such as waves and currents, acting on the surface soil of the seabed will cause the local erosion, soil liquefaction, deformation and sliding of the seabed, easily leading to platform instability and overturning. For example, soil liquefaction occurs frequently in the Yellow River submerged delta, which will cause the deterioration of the bearing capacity of pile foundations of marine structures and the seabed instability and landslide. Therefore, exploring the soil liquefaction mechanism is of great significance for disaster prevention and mitigation in the Yellow River submerged delta.

Soil liquefaction under extreme storm conditions refers to a phenomenon that the accumulation of the pore water pressure inside the soil layer and a decrease in the effective stress (the soil total stress remains unchanged) result in the loss of strength of the soil layer and making the soil in a fluid state. Therefore, monitoring the pore water pressure response in the soil layer under extreme storm conditions has become one of the important means to judge soil liquefaction and explore the liquefaction mechanism. Most of the existing pore water stress monitoring devices use a rod penetration method, but this method often struggles with limited penetration depth and complex and expensive equipment.

SUMMARY

In view of the deficiencies in the prior art, this application provides an auto-collapsible pore pressure probe device, which has simple structure, large penetration depth, and small size, and can realize the long-term stable in-situ monitoring of pore water pressure inside the seabed soil layer within the range of 0-5 m.

Technical solutions of this application are described as follows.

In a first aspect, this application provides an auto-collapsible pore pressure probe device, including:

a support system;
a penetration system; and
a measurement system;
wherein the support system includes a first support frame, a second support frame, four separation mechanisms, an upper support leg, a lower support leg, an upper clamping slot, a lower clamping slot, a support base, and a third support frame; the first support frame is octagonal; and the third support frame is configured to support a rod storage wheel;

the first support frame is configured as a support mechanism of the auto-collapsible pore pressure probe device; and the second support frame is welded into a bottom frame of the first support frame, and is configured to support the penetration system;

the four separation mechanisms are located around a bottom of the first support frame; each of the four separation mechanisms includes a support leg ring clamp, a support leg fixing nut, a support leg fixing bolt; the support leg ring clamp is located between the upper support leg and the lower support leg; the upper support leg is welded to a middle of the first support frame; the lower support leg is welded to an upper surface of the support base; the upper support leg and the lower support leg are detachably connected through the support leg ring clamp; the support base is located at a bottommost end of the first support frame; and the third support frame is welded to an upper end of the second support frame;

the penetration system includes the rod storage wheel, a rod storage wheel motor, a tightening mechanism, a penetration drive motor, a primary transmission gear, two fixing brackets, a fixing bolt, and two friction wheels;

the tightening mechanism includes a probe limit barrel, a rotating shaft, a hydraulic press, a rotary drive hydraulic press, a hydraulic transmission rod, a connector, a rotatable fixing frame, a fixing frame, four support columns, and a rotary frame;

a first end of the rotary drive hydraulic press is welded to the second support frame, and a second end of the rotary drive hydraulic press is connected to the hydraulic transmission rod; an upper end of the rotating shaft is connected to the hydraulic transmission rod, and a lower end of the rotating shaft is welded to the rotary frame; the rotary drive hydraulic press is configured to drive the hydraulic transmission rod to move horizontally to drive the rotary frame to rotate; an upper surface of the rotary frame is fixedly provided with the hydraulic press; an end of the hydraulic press is connected with the hydraulic transmission rod, and is connected to the rotatable fixing frame through the connector; the hydraulic press is configured to drive the hydraulic transmission rod to move horizontally to drive the rotatable fixing frame to rotate; a modular pore pressure probe at a lower end is clamped by the two friction wheels; and the probe limit barrel is connected to the upper surface of the rotary frame through the four support columns;

the rod storage wheel has a regular pentagonal steel-frame structure, and includes a fixing chain and a limit plate; the fixing chain is welded to the rod storage wheel; a first end of the fixing chain is fixed to the rod storage wheel, and a second end of the fixing chain is fixed to an end of the modular pore pressure probe; the limit plate is provided at individual corners of the regular pentagonal steel-frame structure; and a center of the rod storage wheel is connected to the third support frame through a wheel axle of the rod storage wheel for storing the modular pore pressure probe;

the rod storage wheel motor is welded to a side of the third support frame, and is connected to the rod storage wheel through a rotating shaft of the rod storage wheel motor, and the rod storage wheel motor is configured to drive the rod storage wheel to rotate;

the penetration drive motor includes two electric-drive motors which are respectively welded to both sides of the second support frame; the two electric-drive motors are connected to the primary transmission gear through rotating shafts thereof to provide power for rotation of the two friction wheels; the two fixing brackets are the same in size, and are respectively fixed at both ends of the second support frame through the fixing bolt; and each of the two fixing brackets is connected to a plurality of transmission gears to realize reverse rotation of the two friction wheels;

the measurement system includes the modular pore pressure probe, a control cabinet, a pore pressure static penetration test (CPTU) probe, a pore pressure sensor, a probe connector, a connector external thread, a connector internal thread, a fastening strip, a connecting bolt, a watertight plug-in male, a watertight plug-in female, a data transmission and power supply cable, a displacement sensor, and a deck unit;

the modular pore pressure probe has five sections each having a length of 1 m; each of the five sections is provided with the pore pressure sensor; wherein when not working, the pore pressure sensor is stored in the rod storage wheel; the watertight plug-in male is located at a top of the modular pore pressure probe, and the watertight plug-in female is located at a bottom of the modular pore pressure probe; and the modular pore pressure probe is configured to perform data exchange and power transmission through the watertight plug-in male and the watertight plug-in female;

the control cabinet is welded to a side of the third support frame; the five sections of the modular pore pressure probe are connected in sequence through the probe connector; the CPTU probe is located at a bottommost end of the modular pore pressure probe, and the displacement sensor is located at a middle of the modular pore pressure probe; the rod storage wheel motor and the two electric-drive motors are connected to an on-board power supply through the data transmission and power supply cable; the deck unit is in communication connection with the rod storage wheel motor and the two electric-drive motors through the data transmission and power supply cable; and the modular pore pressure probe passes through the probe limit barrel, such that the probe limit barrel is capable of limiting horizontal displacement of the modular pore pressure probe; and the two fixing brackets consist of a first fixing bracket and a second fixing bracket; each of the first fixing bracket and the second fixing bracket is fixedly provided with a secondary transmission gear, a tertiary transmission gear, and a friction transmission gear; when penetrating, the penetration drive motor drives the primary transmission gear to rotate, and through engagement between the secondary transmission gear, the tertiary transmission gear, and the friction transmission gear, the transmission rod and the two friction wheels connected to the transmission rod are driven to rotate; the second fixing bracket is further provided with a quaternary transmission gear with the same size as the tertiary transmission gear; and the quaternary transmission gear is capable of changing rotation direction of the friction transmission gear on the second fixing bracket, such that the two friction wheels rotate in opposite directions, and the modular pore pressure probe is penetrated to a predetermined depth by friction.

In an embodiment, the first support frame is formed by welding of hollow stainless-steel cylindrical tubes.

In an embodiment, the support base consists of four circular plates with the same size.

In an embodiment, each of the four separation mechanisms further includes the support leg fixing nut, the support leg fixing bolt, the upper clamping slot, and the lower clamping slot; the upper clamping slot and the lower clamping slot are provided inside the support leg ring clamp for fixing top protrusions of the upper support leg and the lower support leg; and the support leg fixing nut and the support leg fixing bolt are provided on the support leg ring clamp to tighten the support leg ring clamp.

In an embodiment, the control cabinet is loaded with a battery, a data acquisition instrument, and a control panel.

In an embodiment, the probe connector includes the connector external thread, the fastening strip and the connecting bolt; the probe connector is fixed to a bottom end of each of the five sections of the modular pore pressure probe through the connecting bolt; a bottom of the probe connector is provided with the connector external thread and the fastening strip; and the connector external thread is nested with the connector internal thread in an upper part of each of the five sections of the modular pore pressure probe through the tightening mechanism, and the fastening strip is configured to limit rotation of the connector external thread.

This application further provides an operation method of the auto-collapsible pore pressure probe device, including:
(a) connecting the data transmission and power supply cable with the deck unit and the on-board power supply; making the modular pore pressure probe stored in the rod storage wheel; and deploying the auto-collapsible pore pressure probe device on a seabed surface by using a shipborne winch;
(b) turning on the deck unit, supplying power to the penetration system and sending a penetration instruction to the penetration system; wherein a penetration operation is performed through cooperation of the rod storage wheel motor, the displacement sensor, the tightening mechanism, and the penetration drive motor;
(c) after the penetration instruction is sent, driving the rod storage wheel to rotate and moving a first section of the modular pore pressure probe into the tightening mechanism at a speed of 20±2 mm/s by the rod storage wheel motor, wherein the tightening mechanism does not work; and allowing the two electric-drive motors to rotate to drive the two friction wheels to continuously penetrate the first section of the modular pore pressure probe into soil at a speed of 20±2 mm/s;
(d) when a penetration depth reaches 1 m, feeding back, by the displacement sensor, a movement distance of the first section of the modular pore pressure probe to the control cabinet; controlling, by the control cabinet, the rod storage wheel motor and the penetration drive motor to stop rotating, and controlling the tightening mechanism to start working; wherein the first section of the modular pore pressure probe is fixed by the two friction wheels to prevent rotation; driving, by the hydraulic press on the tightening mechanism, the hydraulic transmission rod to move horizontally, so as to allow the rotatable fixing frame to rotate, thereby reducing a distance between the rotatable fixing frame and the fixing frame to fix a second section of the modular pore pressure probe of the modular pore pressure probes; driving the hydraulic transmission rod to move horizontally by the rotary drive hydraulic press on the tightening mechanism to drive rotation of the rotary frame, so as to drive the second section of the modular pore pressure probe to rotate by 30°;

(e) after the first section of the modular pore pressure probe and the second section of the modular pore pressure probe are connected, feeding back, by the tightening mechanism, a command to the control cabinet, so that the control cabinet continues to control the rod storage wheel motor and the penetration drive motor to work to penetrate the second modular pore pressure probe into the soil; and continuously repeating a rod connection to complete the penetration operation; and (f) performing in-situ detection, and storing data in the control cabinet.

Compared to the prior art, this application has the following beneficial effects.

(1) This application solves the difficulty of monitoring the pore water pressure of the vertical profile of the seabed. The auto-collapsible pore pressure probe device is in frictional penetration. Through a penetration system of the device, the pore pressure probe rod is penetrated to a predetermined depth, which can detect the pore water pressure within 0-5 m inside the seabed and judge the occurrence of seabed liquefaction under extreme storm conditions. At the same time, the head of the pore pressure probe is equipped with a pore pressure static penetration test (CPTU) probe, which can detect the mechanical properties of soil within 0-5 m of the seabed.

(2) This application solves the problem of large equipment and reduced stability caused by the too long pore water pressure probe. This device in this application modularizes the pore pressure probe and can automatically fold, which not only reduces the overall height of the monitoring device, but also improves the stability of the overall device, ensuring safety for long-term monitoring of pore water pressure on the seabed.

(3) This application solves the difficulty that the monitoring device is difficult to recover due to be buried. When extreme storm events are frequent, the support base of the long-term online in-situ monitoring device is prone to be buried by sand and soil, which greatly increases the recovery resistance of the overall device. This device in this application makes the support base and the main body of the device detachable. When the support base is buried, the separation mechanism can be opened by the diver to realize the separation of the support base and the main body of the device.

Additional contents and advantages of the present application will become clear in the description below or can be learned through the practice.

BRIEF DESCRIPTION OF THE DRAWINGS

The above and/or additional aspects and advantages of the present application will become clearer and more understandable from the description of embodiments in conjunction with the drawings.

In the figures: 101—first support frame; 102—second support frame; 103—separation mechanism; 1030—support leg ring clamp; 1031—support leg fixing nut; 1032—support leg fixing bolt; 1033—upper support leg; 1034—lower support leg; 1035—upper clamping slot; 1036—lower clamping slot; 104—support base; 105—third support frame; 201—rod storage wheel; 2010—fixing chain; 2011—limit plate; 202—rod storage wheel motor; 203—tightening mechanism; 2030—probe limit barrel; 2031—rotating shaft; 2032—hydraulic press; 2033—rotary drive hydraulic press; 2034—hydraulic transmission rod; 2035—connector; 2036—rotatable fixing frame; 2037—fixing frame; 2038—support column; 2039—rotary frame; 204—penetration drive motor; 205—primary transmission gear; 206—secondary transmission gear; 207—tertiary transmission gear; 208—fixing bracket; 209—fixing bolt; 210—quaternary transmission gear; 211—friction transmission gear; 212—friction wheel; 213—transmission rod; 301—pore pressure probe; 302—control cabinet; 303—CPTU probe; 304—pore pressure sensor; 305—probe connector; 306—connector external thread; 307—connector internal thread; 308—fastening strip; 309—connecting bolt; 310—watertight plug—in male; 311—watertight plug—in female; 312—data transmission and power supply cable; 313—displacement sensor; and 314—deck unit.

DETAILED DESCRIPTION OF EMBODIMENTS

The present disclosure will be further described in detail below in conjunction with the accompanying drawings and embodiments to understand the above objects, features and advantages of the present disclosure more clearly. It should be noted that embodiments of the present application and the features therein may be combined with each other in the case of no contradiction.

Many details are described below to facilitate the understanding of the present disclosure. However, the present disclosure may also be implemented in other ways different from those described herein. Therefore, the scope of the disclosure is not limited by the embodiments disclosed below.

Figure 1:
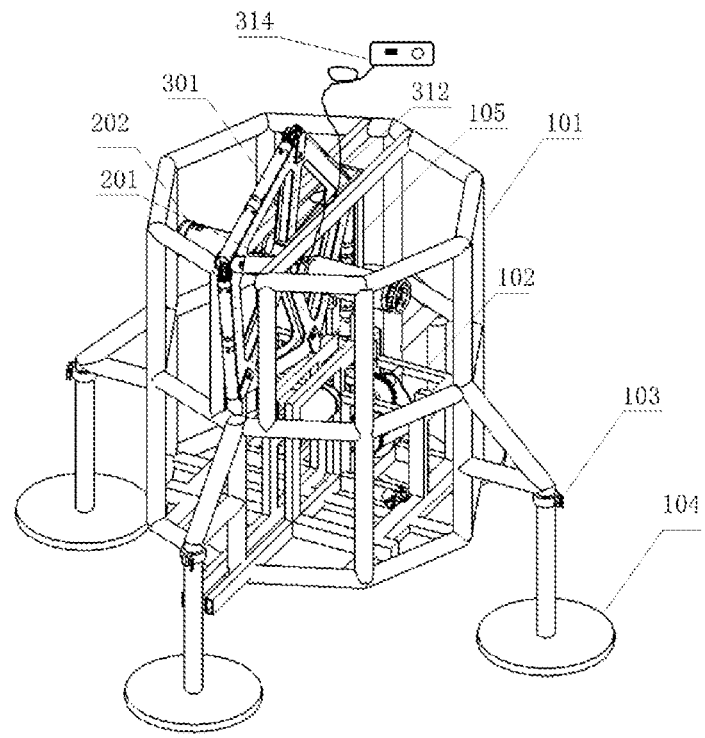
FIG. 1 is a perspective view of an auto-collapsible pore pressure probe device according to one embodiment of the present disclosure.
Figure 2:
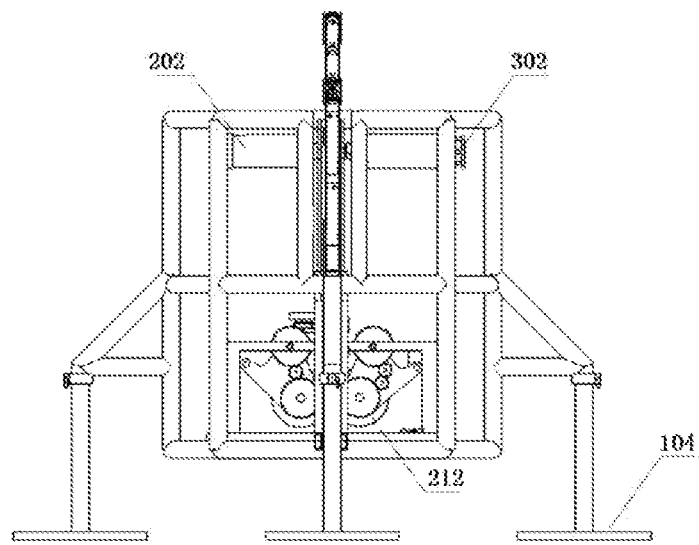
FIG. 2 is a front view of the auto-collapsible pore pressure probe device according to one embodiment of the present disclosure.
Figure 3:
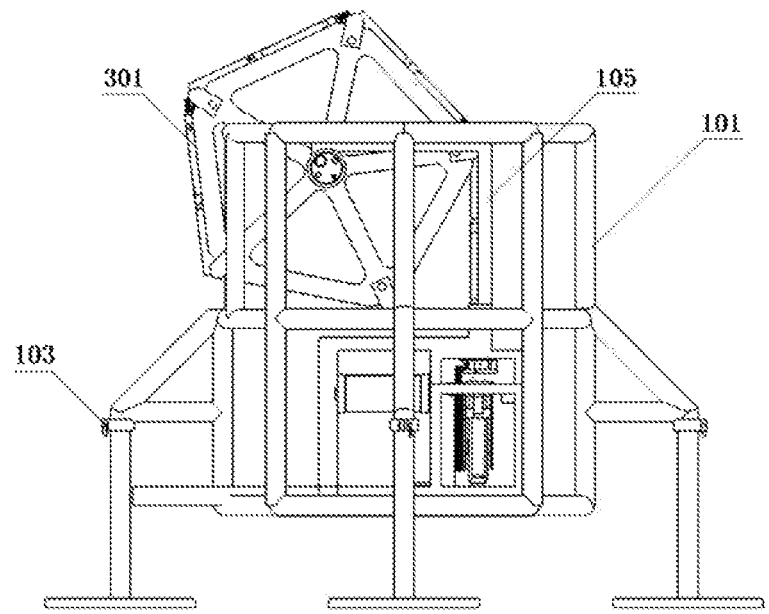
FIG. 3 is a side view of the auto-collapsible pore pressure probe device according to one embodiment of the present disclosure.
Figure 4:
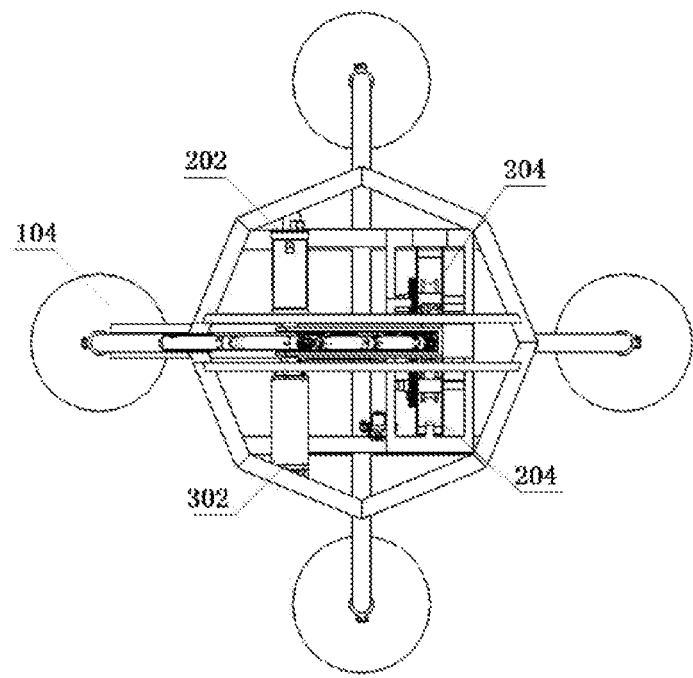
FIG. 4 is a top view of the auto-collapsible pore pressure probe device according to one embodiment of the present disclosure.
Figure 5:
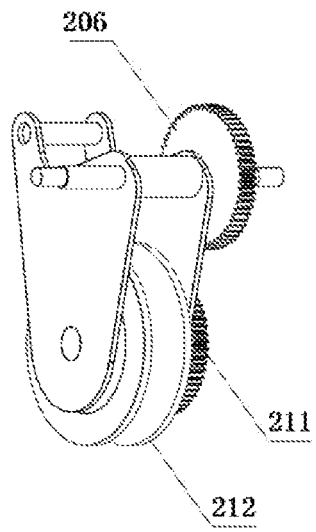
FIG. 5 is a perspective view of a friction wheel according to one embodiment of the present disclosure.
Figure 6:
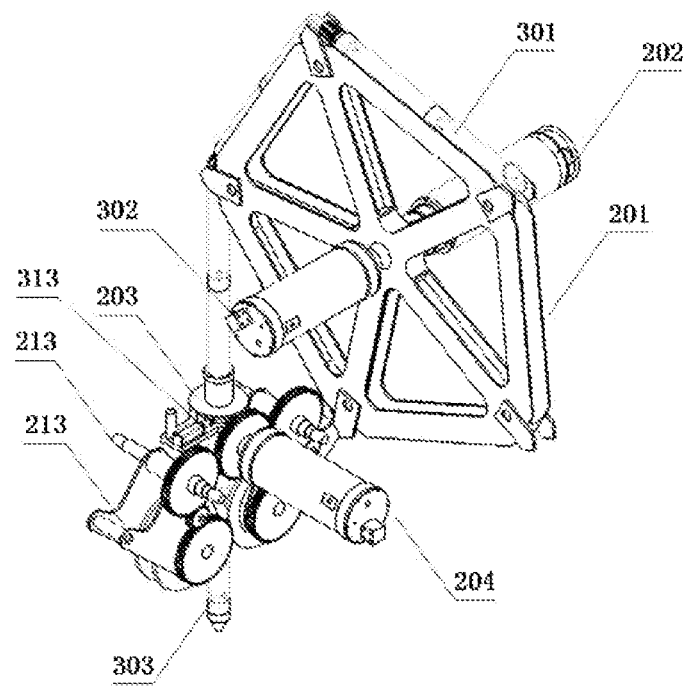
FIG. 6 is a perspective view of a penetration system according to one embodiment of the present disclosure.
Figure 7:
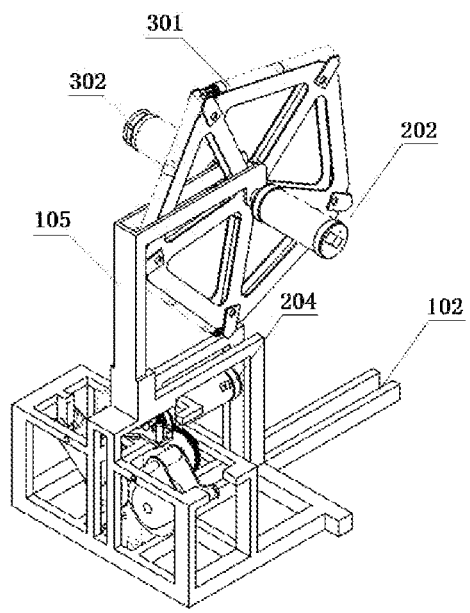
FIG. 7 is a perspective view of the penetration system and second and third support frames according to one embodiment of the present disclosure.
Figure 8:
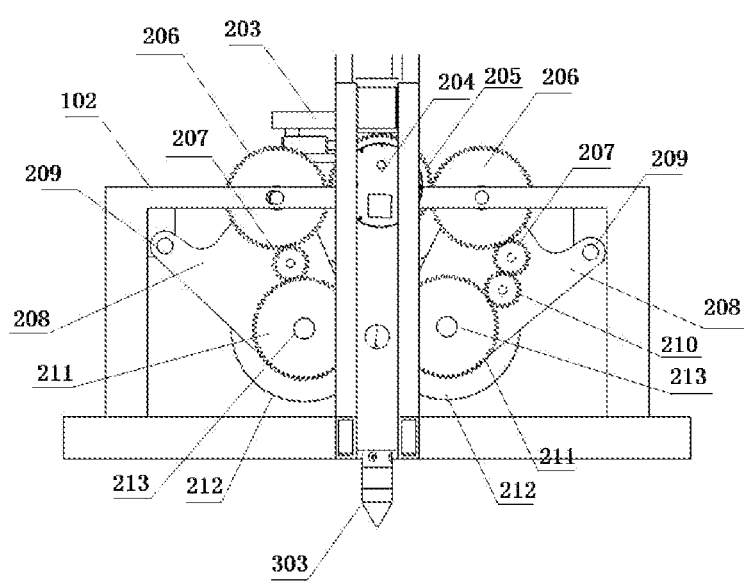
FIG. 8 is a front view of the penetration system according to one embodiment of the present disclosure.
Figure 9:
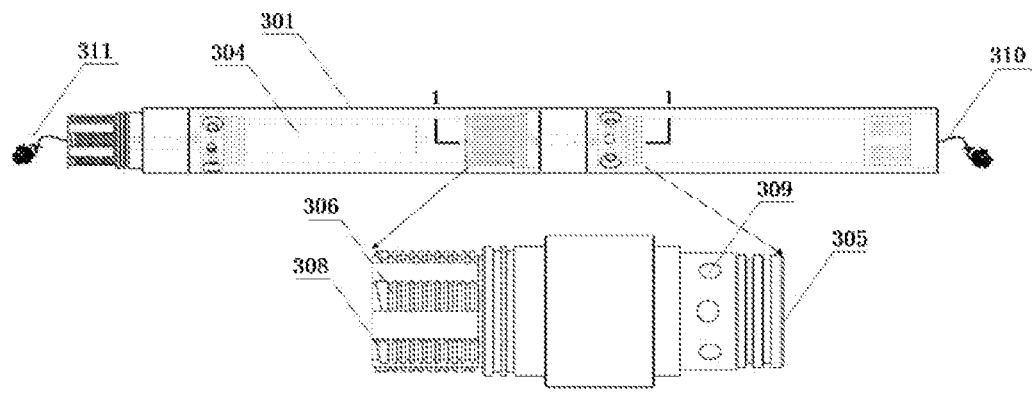
FIG. 9 schematically shows a structure of a probe connector according to one embodiment of the present disclosure.
Figure 10:
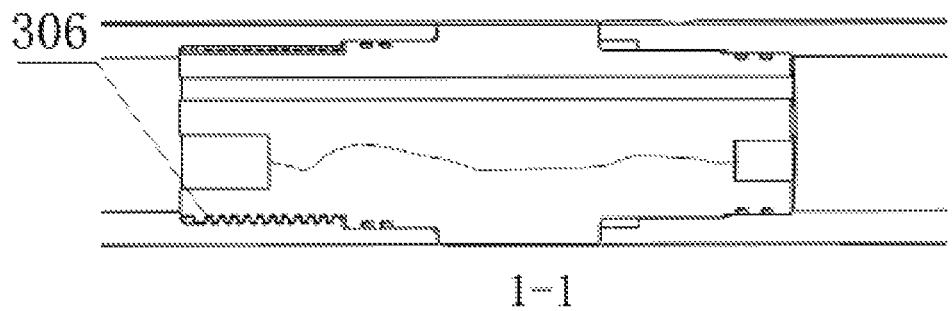
FIG. 10 is a sectional view of the probe connector in FIG. 9 along line 1-1.
Figure 11:
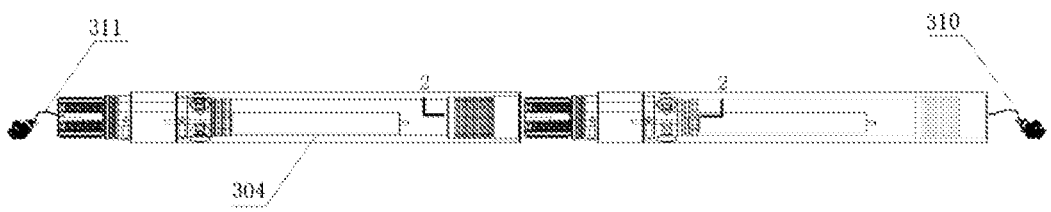
FIG. 11 schematically shows a connection mode of a probe according to one embodiment of the present disclosure.
Figure 12:
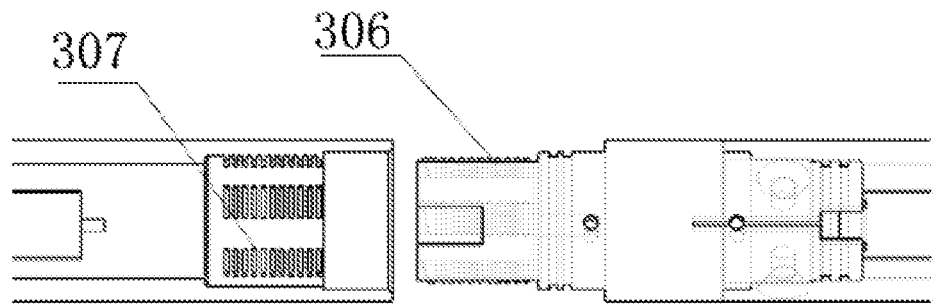
FIG. 12 is a sectional view of the probe in FIG. 11 along line 2-2.
Figure 13:
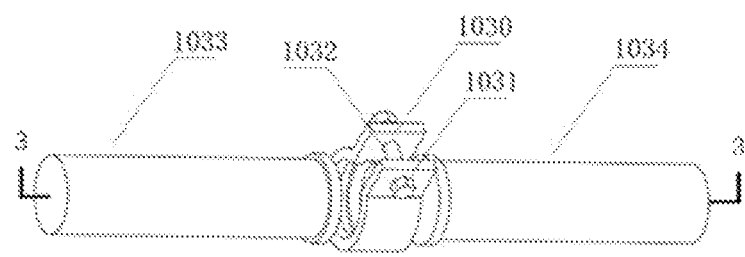
FIG. 13 schematically shows a separation mechanism according to one embodiment of the present disclosure.
Figure 14:
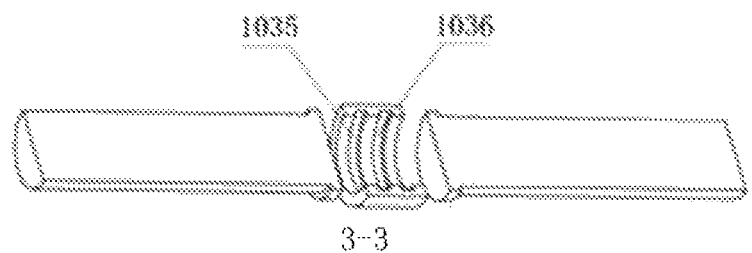
FIG. 14 is a sectional view of the separation mechanism in FIG. 13 along line 3-3.
Figure 15A:
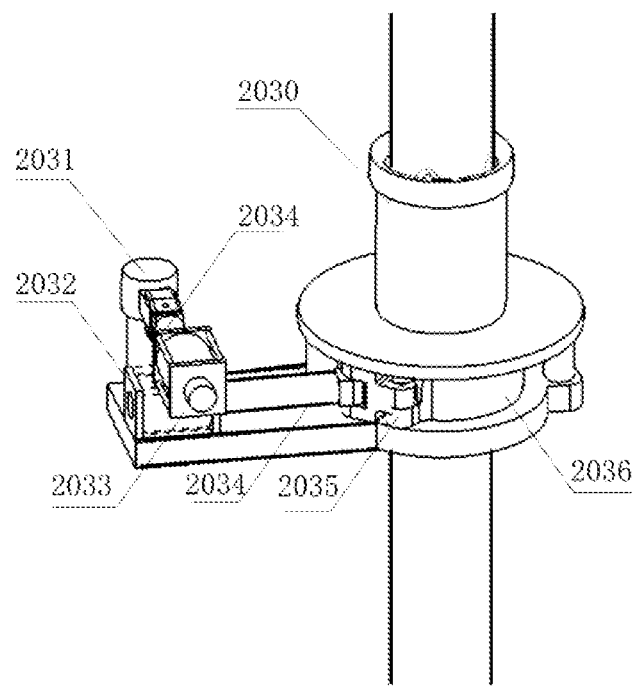
FIGS. 15A-B are perspective views of a tightening mechanism according to one embodiment of the present disclosure.
Figure 15B:
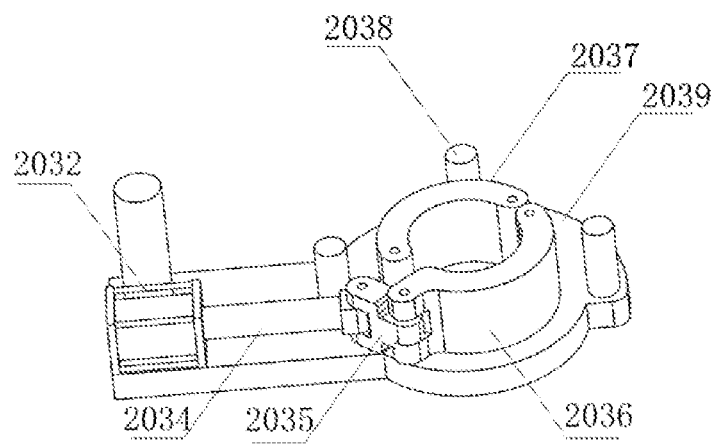
Figure 16:
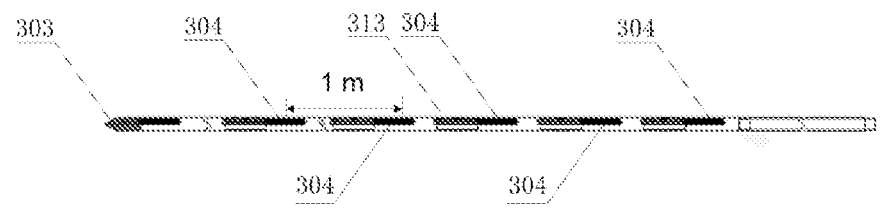
FIG. 16 schematically shows a structure of a pore pressure probe according to one embodiment of the present disclosure.
Figure 17:
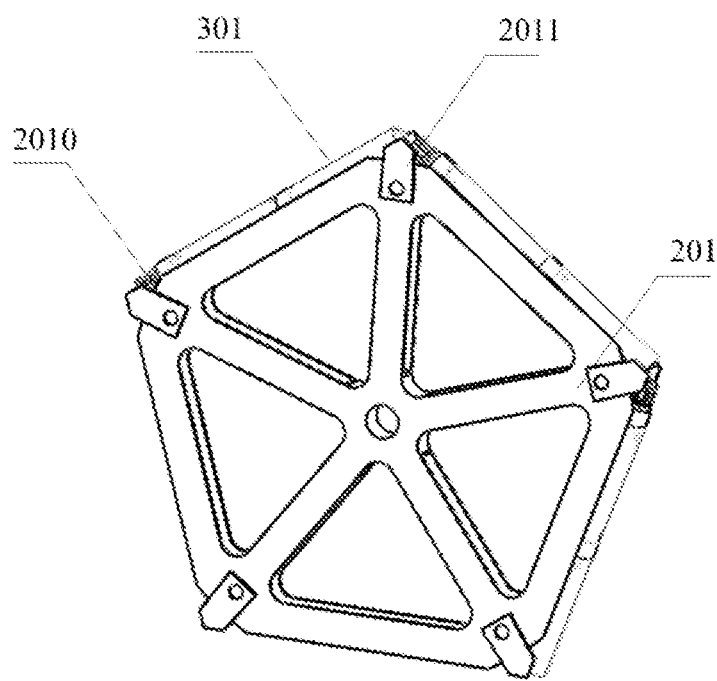
FIG. 17 is a perspective view of a rod storage wheel according to one embodiment of the present disclosure.

An auto-collapsible pore pressure probe device of the disclosure and an operating method thereof will be further described with reference to FIGS. 1 to 17.

As shown in FIGS. 1 to 10, an auto-collapsible pore pressure probe device includes a support system, a penetration system, and a measurement system. The support system includes a first support frame 101, a second support frame 102, four separation mechanisms 103, an upper support leg 1033, a lower support leg 1034, an upper clamping slot 1035, a lower clamping slot 1036, a support base 104, and a third support frame 105. The first support frame 101 is octagonal and is formed by welding of hollow cylindrical tube made of 316L stainless steel. The first support frame 101 is configured as a support mechanism of the auto-collapsible pore pressure probe device. The second support frame 102 is welded into a bottom frame of the first support frame 101 and configured to support some parts in the penetration system other than the rod storage wheel 201 and the rod storage wheel motor 202. The four separation mechanisms 103 are located around the bottom of the first support frame 101.

Each of the four separation mechanisms 103 includes a support leg ring clamp 1030, a support leg fixing nut 1031 and a support leg fixing bolt 1032. The support leg ring clamp 1030 is located between the upper support leg 1033 and the lower support leg 1034. The upper support leg 1033 is welded to a middle of the first support frame 101. The lower support leg 1034 is welded to an upper surface of the support base 104. The upper support leg 1033 and the lower support leg 1034 are detachably connected through the support leg ring clamp 1030. The first support frame 101 and the support base 104 can be separated. Each of the four separation mechanisms 103 further includes the support leg fixing nut 1031, the support leg fixing bolt 1032, the upper clamping slot 1035, and the lower clamping slot 1036. The upper clamping slot 1035 and the lower clamping slot 1036 are opened inside the support leg ring clamp 1030 for fixing top protrusions of the upper support leg 1033 and the lower support leg 1034. The support leg fixing nut 1031 and the support leg fixing bolt 1032 are provided on the support leg ring clamp 1030 to tighten the support leg ring clamp 1030. The support base 104 is located at the bottommost end of the first support frame 101, and the support base 104 consists of four circular plates with the same size, which can reduce the settling rate of the device due to the own weight. The third support frame 105 is welded to the upper end of the second support frame 102, which can support the rod storage wheel 201, the rod storage wheel motor 202, and the control cabinet 302.

The penetration system includes a rod storage wheel 201, a rod storage wheel motor 202, a tightening mechanism 203, a penetration drive motor 204, a primary transmission gear 205, two fixing brackets 208, a fixing bolt 209, and two friction wheels 212. The tightening mechanism 203 includes a probe limit barrel 2030, a rotary shaft 2031, a hydraulic press 2032, a rotary drive hydraulic press 2033, a hydraulic transmission rod 2034, a connector 2035, a rotatable fixing frame 2036, a fixing frame 2037, four support columns 2038, and a rotary frame 2039. A first end of the rotary drive hydraulic press 2033 is welded to the second support frame 102, and a second end of the rotary drive hydraulic press 2033 is connected to the hydraulic transmission rod 2034. The upper end of the rotary shaft 2031 is connected to the hydraulic transmission rod 2034 connected to the rotary drive hydraulic press 2033, and the lower end of the rotary shaft 2031 is welded to the rotary frame 2039. The rotary drive hydraulic press 2033 can drive the horizontal movement of the hydraulic transmission rod 2034 to drive the rotary frame 2039 to rotate. An upper surface of the rotary frame 2039 is fixedly provided with the hydraulic press 2032. A first end of the hydraulic press 2032 is connected with the hydraulic transmission rod 2034 and is connected to the rotatable fixing frame 2036 through the connector 2035. The hydraulic press 2032 can drive the horizontal movement of the hydraulic transmission rod 2034 to drive the rotatable fixing frame 2036 to rotate. The spacing between the rotatable fixing frame 2036 and the fixing frame 2037 are reduced, so as to fix the modular pore pressure probe 301 on the upper end. The modular pore pressure probe 301 on the lower end is tightened by the friction wheel 212 to prevent the relative rotation of the two probes when the probes are assembled. The probe limit barrel 2030 is connected to the upper surface of the rotary frame 2039 by four support columns 2038.

The rod storage wheel 201 has a regular pentagonal steel-frame structure and includes a fixing chain 2010 and a limit plate 2011. The fixing chain 2010 is welded to the rod storage wheel 201. A first end of the fixing chain 2010 is fixed to the rod storage wheel 201, and a second end of the fixing chain 2010 is fixed to the end of the modular pore pressure probe 301. The limit plate 2011 is disposed at the individual corners of the regular pentagonal steel-frame structure, which is used to prevent the probe from leaving the rod storage wheel 201. The rod storage wheel 201 will apply a pull force opposite to the penetration direction of the pore pressure probe 301, and the pore pressure probe 301 is firmly fixed on the rod storage wheel 201. At the same time, the center of the rod storage wheel 201 is connected to the third support frame 105 through the wheel axle of the rod storage wheel 201 for storing the modular pore pressure probe 301. The rod storage wheel motor 202 is welded to the side of the third support frame 105 and is connected to the rod storage wheel 201 through a rotating shaft of the rod storage wheel motor 202, the rod storage wheel motor 202 is configured to drive the rod storage wheel 201 to rotate, and the pore pressure probe 301 stored in the rod storage wheel 201 is continuously sent into the tightening mechanism 203. The penetration drive motor 204 includes two electric-drive motors which are respectively welded to both sides of the second support frame 102. Two penetration drive motors 204 are connected to the primary transmission gear 205 through rotating shafts of two penetration drive motors 204 to provide power for the rotation of two friction wheels 212. Two fixing brackets 208 with the same size are respectively fixed at both ends of the second support frame 102 by the fixing bolts 209. A plurality of transmission gears are connected to the first and second fixing brackets 208 at left and right ends to realize a reverse rotation of the two friction wheels 212. The first fixing bracket located at the left end of the second support frame 102 is fixedly provided with a secondary transmission gear 206, a tertiary transmission gear 207, and a friction transmission gear 211. When penetrating, the penetration drive motor 204 drives the primary transmission gear 205 to rotate, and at the same time, through engagement between the secondary transmission gear 206, the tertiary transmission gear 207, and the friction transmission gear 211, the transmission rod 213 and the two friction wheels 212 connected to the transmission rod 213 are driven to rotate. The second fixing bracket at the right end is further provided with a quaternary transmission gear 210 with the same size as the tertiary transmission gear 207. The quaternary transmission gear 210 can change the rotation direction of the friction transmission gear 211 on the second fixing bracket, thereby realizing the reverse rotation of the two friction wheels 212, and the modular pore pressure probe 301 is penetrated to the predetermined depth by friction.

The measurement system includes the modular pore pressure probe 301, a control cabinet 302, a pore pressure static penetration test (CPTU) probe 303, a pore pressure sensor 304, a probe connector 305, a connector external thread 306, a connector internal thread 307, a fastening strip 308, a connecting bolt 309, a watertight plug-in male 310, a watertight plug-in female 311, a data transmission and power supply cable 312, a displacement sensor 313, and a deck unit 314. The deck unit 314 is used to control the penetration process of the pore pressure probe 301, adjust the penetration speed of the pore pressure probe 301, and view the data collected by the CPTU probe during the penetration process. The pore pressure probe 301 adopts a modular design. The modular pore pressure probe 301 has five sections each having a length of 1 m. Each of the five sections is provided with the pore pressure sensor 304. When not working, the pore pressure sensor 304 is stored in the rod storage wheel 201, and the pore pressure probe 301 is mainly used to load the pore pressure sensor 304 and the CPTU probe 303. The watertight plug-in male 310 is located at the top of the modular pore pressure probe 301, and the watertight plug-in female 311 is located at the bottom of the modular pore pressure probe 301. The pore pressure probe 301 is configured to perform data exchange and power transmission through the watertight plug-in male 310 and the watertight plug-in female 311. The control cabinet 302 is welded to the side of the third support frame 105. The five sections of the modular pore pressure probe 301 are connected in in sequence through the probe connector 305. The CPTU probe 303 is located at the bottommost end of the modular pore pressure probe 301 for measuring the tip resistance, side friction resistance and pore water pressure inside the soil layer. The displacement sensor 313 is located at the middle of the modular pore pressure probe 301, and the displacement sensor 313 is mainly used to record the penetration depth of the pore pressure probe 301. When the penetration depth reaches 1 m every time, the rod storage wheel motor 202 and two penetration drive motors 204 suspend work, the tightening mechanism 203 will connect the two sections of the modular pore pressure probe 301. An on-board power supply is introduced by the rod storage wheel motor 202 and two penetration drive motors 204 through the data transmission and power supply cable 312 to provide a driving force. The deck unit 314 is in communication connection with the rod storage wheel motor 202 and two penetration drive motors 204 by the data transmission and power supply cable 312. During the deployment and recovery process, the automatic assembly, penetration, recovery and automatic disassembly of the pore pressure probe 301 are transmitted to each motor or drive motor by the data transmission and power supply cable 312. The modular pore pressure probe 301 passes through the probe limit barrel 2030, thereby limiting the horizontal displacement of the pore pressure probe 301. The control cabinet 302 is loaded with a battery, a data acquisition instrument, and a control panel and used to collect measurement data and control assembly, penetration, disassembly and recovery of the pore pressure probe 301. The probe connector 305 is fixed to the bottom end of each of the five sections of the modular pore pressure probe 301 by the connecting bolt 309. The bottom of the probe connector 305 is provided with the connector external thread 306 and the fastening strip 308. The connector external thread 306 is nested with the connector internal thread 307 in an upper part of each of the five sections of the modular pore pressure probe 301 through the tightening mechanism 203, and the fastening strip 308 is configured to limit rotation of the connector external thread 306, the rotation angle is 30°. The modular pore pressure probes are assembled into one probe.

The operation method of the auto-collapsible pore pressure probe device includes the following steps.

(a) The data transmission and power supply cable 312 is connected with the deck unit 314 and the on-board power supply. The modular pore pressure probes 301 are stored in the rod storage wheel 201. Then the auto-collapsible pore pressure probe device is deployed on a seabed surface by a shipborne winch.

(b) After the device is placed stably, the deck unit 314 is turned on to supply power and a penetration instruction to the penetration system of the device. The penetration operation requires the cooperation of the rod storage wheel motor 202, the displacement sensor 313, the tightening mechanism 203, and the penetration drive motor 204.

(c) After the penetration instruction is sent, the rod storage wheel motor 202 drives the rod storage wheel 201 to rotate and move the modular pore pressure probe 301 into the tightening mechanism 203 at the speed of 20±2 mm/s, where the tightening mechanism 203 does not work. At the same time, the two penetration drive motors 204 rotate together to drive the friction wheel 212 to continuously penetrate the modular pore pressure probe 301 into the soil at the speed of 20±2 mm/s.

(d) When the penetration depth reaches 1 m, the displacement sensor 313 feeds back the movement distance of the modular pore pressure probe 301 to the control cabinet 302. The control cabinet 302 controls the rod storage wheel motor 202 and the penetration drive motor 204 to stop rotating, and at the same time controls the tightening mechanism 203 to start working. The lower modular pore pressure probe 301 is fixed by two friction wheels 212 to prevent rotation, and the hydraulic press 2032 on the tightening mechanism 203 first drives the horizontal movement of the hydraulic transmission rod 2034, so that the rotatable fixing frame 2036 rotates, thereby reducing a distance between the rotatable fixing frame 2036 and the fixing frame 2037 to fix the upper modular pore pressure probe 301. The rotary drive hydraulic press 2033 on the tightening mechanism 203 drives the horizontal movement of the hydraulic transmission rod 2034, so as to drive the rotation of the rotary frame 2039, so as to drive the upper end of the modular pore pressure probe 301 to rotate by 30°.

(e) After the lower and upper modular pore pressure probes 301 are connected, the tightening mechanism 203 will feedback a command to the control cabinet 302, so that the control cabinet 302 continues to control the rod storage wheel motor 202 and the penetration drive motor 204 to work to penetrate the upper modular pore pressure probe 301 into the soil, so as to repeat continuously a connection rod to complete the penetration process.

(f) After completing the penetration process, in-situ detection can begin, and the data is stored in the control cabinet 302.

As used herein, the term "a plurality of" refers to two or more. Unless otherwise expressly specified, the orientation or positional relationship indicated by terms "up", and "down", etc. is based on the orientation or positional relationship shown in the accompanying drawings, and these terms are only for the convenience of describing the disclosure and simplifying the description, rather than indicating or implying that the indicated device or element must have a specific orientation, or be constructed or operated in a specific orientation. Therefore, these terms should not be understood as a limitation of the present disclosure. As used herein, terms, such as "installation", "connection", and "fixation", should be understood in a broad sense, for example, the "connection" may be fixed connection, detachable connection, or integral connection; or direct connection or indirect connection through an intermediate medium. For those skilled in the art, the specific meaning of the above terms can be understood according to specific situations.

As used herein, the terms "one embodiment", "some embodiments", and "specific embodiments", etc. indicate that the specific features, structures, materials or characteristics described in conjunction with are included in at least one embodiment of the present disclosure. In the disclosure, the description of the above terms does not necessarily refer to the same embodiment or example. Further, the specific features, structures, materials or characteristics described may be combined in a suitable manner in any one or more embodiments.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. An auto-collapsible pore pressure probe device, comprising:
   a support system;
   a penetration system; and
   a measurement system;
   wherein the support system comprises a first support frame, a second support frame, four separation mechanisms, an upper support leg, a lower support leg, an upper clamping slot, a lower clamping slot, a support base, and a third support frame; the first support frame is octagonal; and the third support frame is configured to support a rod storage wheel;
   the first support frame is configured as a support mechanism of the auto-collapsible pore pressure probe device; and the second support frame is welded into a bottom frame of the first support frame, and is configured to support the penetration system;
   the four separation mechanisms are located around a bottom of the first support frame; each of the four separation mechanisms comprises a support leg ring clamp, a support fixing nut, and a support leg fixing bolt; the support leg ring clamp is located between the upper support leg and the lower support leg; the upper support leg is welded to a middle of the first support frame; the lower support leg is welded to an upper surface of the support base; the upper support leg and the lower support leg are detachably connected through the support leg ring clamp; the support base is located at a bottommost end of the first support frame; and the third support frame is welded to an upper end of the second support frame;
   the penetration system comprises the rod storage wheel, a rod storage wheel motor, a tightening mechanism, a penetration drive motor, a primary transmission gear, two fixing brackets, a fixing bolt, and two friction wheels;
   the tightening mechanism comprises a probe limit barrel, a rotating shaft, a hydraulic press, a rotary drive hydraulic press, a hydraulic transmission rod, a connector, a rotatable fixing frame, a fixing frame, four support columns, and a rotary frame;
   a first end of the rotary drive hydraulic press is welded to the second support frame, and a second end of the rotary drive hydraulic press is connected to the hydraulic transmission rod; an upper end of the rotating shaft is connected to the hydraulic transmission rod, and a lower end of the rotating shaft is welded to the rotary frame; the rotary drive hydraulic press is configured to drive the hydraulic transmission rod to move horizontally to drive the rotary frame to rotate; an upper surface of the rotary frame is fixedly provided with the hydraulic press; an end of the hydraulic press is connected with the hydraulic transmission rod, and is connected to the rotatable fixing frame through the connector; the hydraulic press is configured to drive the hydraulic transmission rod to move horizontally to drive the rotatable fixing frame to rotate; a modular pore pressure probe at a lower end is clamped by the two friction wheels; and the probe limit barrel is connected to the upper surface of the rotary frame through the four support columns;
   the rod storage wheel has a regular pentagonal steel-frame structure, and comprises a fixing chain and a limit plate; the fixing chain is welded to the rod storage wheel; a first end of the fixing chain is fixed to the rod storage wheel, and a second end of the fixing chain is fixed to an end of the modular pore pressure probe; the limit plate is provided at individual corners of the regular pentagonal steel-frame structure; and a center of the rod storage wheel is connected to the third support frame through a wheel axle of the rod storage wheel for storing the modular pore pressure probe;
   the rod storage wheel motor is welded to a side of the third support frame, and is connected to the rod storage wheel through a rotating shaft of the rod storage wheel motor, and the rod storage wheel motor is configured to drive the rod storage wheel to rotate;
   the penetration drive motor comprises two electric-drive motors which are respectively welded to both sides of the second support frame; the two electric-drive motors are connected to the primary transmission gear through rotating shafts thereof to provide power for rotation of the two friction wheels; the two fixing brackets are the same in size, and are respectively fixed at both ends of the second support frame through the fixing bolt; and each of the two fixing brackets is connected to a plurality of transmission gears to realize reverse rotation of the two friction wheels;
   the measurement system comprises the modular pore pressure probe, a control cabinet, a pore pressure static penetration test (CPTU) probe, a pore pressure sensor, a probe connector, a connector external thread, a connector internal thread, a fastening strip, a connecting bolt, a watertight plug-in male, a watertight plug-in female, a data transmission and power supply cable, a displacement sensor, and a deck unit;

the modular pore pressure probe has five sections each having a length of 1 m; each of the five sections is provided with the pore pressure sensor; wherein when not working, the pore pressure sensor is stored in the rod storage wheel; the watertight plug-in male is located at a top of the modular pore pressure probe, and the watertight plug-in female is located at a bottom of the modular pore pressure probe; and the modular pore pressure probe is configured to perform data exchange and power transmission through the watertight plug-in male and the watertight plug-in female;

the control cabinet is welded to a side of the third support frame; the five sections of the modular pore pressure probe are connected in sequence through the probe connector; the CPTU probe is located at a bottommost end of the modular pore pressure probe, and the displacement sensor is located at a middle of the modular pore pressure probe; the rod storage wheel motor and the two electric-drive motors are connected to an on-board power supply through the data transmission and power supply cable; the deck unit is in communication connection with the rod storage wheel motor and the two electric-drive motors through the data transmission and power supply cable; and the modular pore pressure probe passes through the probe limit barrel, such that the probe limit barrel is capable of limiting horizontal displacement of the modular pore pressure probe; and the two fixing brackets consist of a first fixing bracket and a second fixing bracket; each of the first fixing bracket and the second fixing bracket is fixedly provided with a secondary transmission gear, a tertiary transmission gear, and a friction transmission gear; when penetrating, the penetration drive motor drives the primary transmission gear to rotate, and through engagement between the secondary transmission gear, the tertiary transmission gear, and the friction transmission gear, the transmission rod and the two friction wheels connected to the transmission rod are driven to rotate; the second fixing bracket is further provided with a quaternary transmission gear with the same size as the tertiary transmission gear; and the quaternary transmission gear is capable of changing rotation direction of the friction transmission gear on the second fixing bracket, such that the two friction wheels rotate in opposite directions, and the modular pore pressure probe is penetrated to a predetermined depth by friction.

2. The auto-collapsible pore pressure probe device of claim 1, wherein the first support frame is formed by welding of hollow stainless-steel cylindrical tubes.

3. The auto-collapsible pore pressure probe device of claim 1, wherein the support base consists of four circular plates with the same size.

4. The auto-collapsible pore pressure probe device of claim 1, wherein each of the four separation mechanisms further comprises the support leg fixing nut, the support leg fixing bolt, the upper clamping slot, and the lower clamping slot; the upper clamping slot and the lower clamping slot are provided inside the support leg ring clamp for fixing top protrusions of the upper support leg and the lower support leg; and the support leg fixing nut and the support leg fixing bolt are provided on the support leg ring clamp to tighten the support leg ring clamp.

5. The auto-collapsible pore pressure probe device of claim 1, wherein the control cabinet is loaded with a battery, a data acquisition instrument, and a control panel.

6. The auto-collapsible pore pressure probe device of claim 1, wherein the probe connector comprises the connector external thread, the fastening strip and the connecting bolt; the probe connector is fixed to a bottom end of each of the five sections of the modular pore pressure probe through the connecting bolt; a bottom of the probe connector is provided with the connector external thread and the fastening strip; and the connector external thread is nested with the connector internal thread in an upper part of each of the five sections of the modular pore pressure probe through the tightening mechanism, and the fastening strip is configured to limit rotation of the connector external thread.

7. An operation method of the auto-collapsible pore pressure probe device of claim 1, comprising:
  (a) connecting the data transmission and power supply cable with the deck unit and the on-board power supply; making the modular pore pressure probe stored in the rod storage wheel; and deploying the auto-collapsible pore pressure probe device on a seabed surface by using a shipborne winch;
  (b) turning on the deck unit, supplying power to the penetration system and sending a penetration instruction to the penetration system; wherein a penetration operation is performed through cooperation of the rod storage wheel motor, the displacement sensor, the tightening mechanism, and the penetration drive motor;
  (c) after the penetration instruction is sent, driving the rod storage wheel to rotate and moving a first section of the modular pore pressure probe into the tightening mechanism at a speed of 20±2 mm/s by the rod storage wheel motor, wherein the tightening mechanism does not work; and allowing the two electric-drive motors to rotate to drive the two friction wheels to continuously penetrate the first section of the modular pore pressure probe into soil at a speed of 20±2 mm/s;
  (d) when a penetration depth reaches 1 m, feeding back, by the displacement sensor, a movement distance of the first section of the modular pore pressure probe to the control cabinet; controlling, by the control cabinet, the rod storage wheel motor and the penetration drive motor to stop rotating, and controlling the tightening mechanism to start working; wherein the first section of the modular pore pressure probe is fixed by the two friction wheels to prevent rotation; driving, by the hydraulic press on the tightening mechanism, the hydraulic transmission rod to move horizontally, so as to allow the rotatable fixing frame to rotate, thereby reducing a distance between the rotatable fixing frame and the fixing frame to fix a second section of the modular pore pressure probe of the modular pore pressure probes; driving the hydraulic transmission rod to move horizontally by the rotary drive hydraulic press on the tightening mechanism to drive rotation of the rotary frame, so as to drive the second section of the modular pore pressure probe to rotate by 30°;
  (e) after the first section of the modular pore pressure probe and the second section of the modular pore pressure probe are connected, feeding back, by the tightening mechanism, a command to the control cabinet, so that the control cabinet continues to control the rod storage wheel motor and the penetration drive motor to work to penetrate the second section of the modular pore pressure probe into the soil; and continuously repeating a rod connection to complete the penetration operation; and (f) performing in-situ detection, and storing data in the control cabinet.

\* \* \* \* \*